United States Patent
Adachi

(10) Patent No.: US 11,068,706 B2
(45) Date of Patent: Jul. 20, 2021

(54) IMAGE PROCESSING DEVICE, IMAGE PROCESSING METHOD, AND PROGRAM

(71) Applicant: CANON KABUSHIKI KAISHA, Tokyo (JP)

(72) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/297,365

(22) Filed: Mar. 8, 2019

(65) Prior Publication Data

US 2019/0286893 A1    Sep. 19, 2019

(30) Foreign Application Priority Data

Mar. 15, 2018    (JP) ................................ 2018-047731

(51) Int. Cl.
| | |
|---|---|
| *G06K 9/00* | (2006.01) |
| *G06T 7/11* | (2017.01) |
| *G06T 7/136* | (2017.01) |
| *G06T 5/50* | (2006.01) |

(52) U.S. Cl.
CPC ..... *G06K 9/00369* (2013.01); *G06K 9/00255* (2013.01); *G06T 5/50* (2013.01); *G06T 7/11* (2017.01); *G06T 7/136* (2017.01); *G06T 2207/10016* (2013.01)

(58) Field of Classification Search
CPC .............................. G06K 9/468; G06K 9/6206
See application file for complete search history.

(56) References Cited

U.S. PATENT DOCUMENTS

| | | | | |
|---|---|---|---|---|
| 4,255,654 A | * | 3/1981 | Suzuki ..................... | G01C 3/32 |
| | | | | 250/204 |
| 8,675,965 B2 | * | 3/2014 | Lieberknecht ........ | G06F 16/583 |
| | | | | 382/190 |
| 9,906,778 B2 | * | 2/2018 | Yamamoto ........... | H04N 13/327 |
| 10,102,426 B2 | * | 10/2018 | Kito .......................... | G01J 1/44 |
| 10,559,089 B2 | * | 2/2020 | Inada ....................... | G01C 3/08 |
| 2004/0042661 A1 | * | 3/2004 | Ulrich .................... | G06K 9/468 |
| | | | | 382/181 |
| 2007/0237387 A1 | | 10/2007 | Avidan | |

FOREIGN PATENT DOCUMENTS

JP    2009-27393 A    2/2009

* cited by examiner

*Primary Examiner* — Joshua L Schwartz
(74) *Attorney, Agent, or Firm* — Canon U.S.A., IP Division

(57) ABSTRACT

The specifying step of specifying a camera to be adjusted among multiple cameras based on the history of a similarity for an object searched from images captured by the multiple cameras, the calculation step of calculating similarities for the images captured by the multiple cameras with respect to the object of the search target, and the addition step of adding an adjustment value to a similarity for an image captured by the specified camera among the similarities calculated at the calculation step are included.

18 Claims, 13 Drawing Sheets

FIG. 4

| IMAGE CAPTURING TIME | OBJECT ID | CAMERA ID | FEATURE AMOUNT | THUMBNAIL | ATTRIBUTE |
|---|---|---|---|---|---|
| 09:00:00 | 0001 | 101 | (f1, f2, f3, ...) | ... | ... |
| 09:00:00 | 0002 | 102 | (f1, f2, f3, ...) | ... | ... |
| 09:03:00 | 0003 | 101 | (f1, f2, f3, ...) | ... | ... |
| 09:05:00 | 0004 | 101 | (f1, f2, f3, ...) | ... | ... |
| 09:06:00 | 0005 | 102 | (f1, f2, f3, ...) | ... | ... |
| 09:18:00 | 0006 | 103 | (f1, f2, f3, ...) | ... | ... |
| 09:50:00 | 0007 | 103 | (f1, f2, f3, ...) | ... | ... |
| 09:55:00 | 0008 | 103 | (f1, f2, f3, ...) | ... | ... |
| 10:04:00 | 0009 | 102 | (f1, f2, f3, ...) | ... | ... |
| 10:19:00 | 0010 | 103 | (f1, f2, f3, ...) | ... | ... |
| 10:42:00 | 0011 | 103 | (f1, f2, f3, ...) | ... | ... |
| 11:08:00 | 0012 | 103 | (f1, f2, f3, ...) | ... | ... |
| 11:09:00 | 0013 | 102 | (f1, f2, f3, ...) | ... | ... |

FIG. 8

| OBJECT ID | CAMERA ID | SIMILARITY |
|---|---|---|
| 0001 | 101 | 884 |
| 0004 | 101 | 912 |
| 0005 | 102 | 687 |
| 0007 | 103 | 307 |
| 0009 | 102 | 665 |
| 0011 | 103 | 411 |
| 0012 | 103 | 238 |
| 0013 | 102 | 859 |

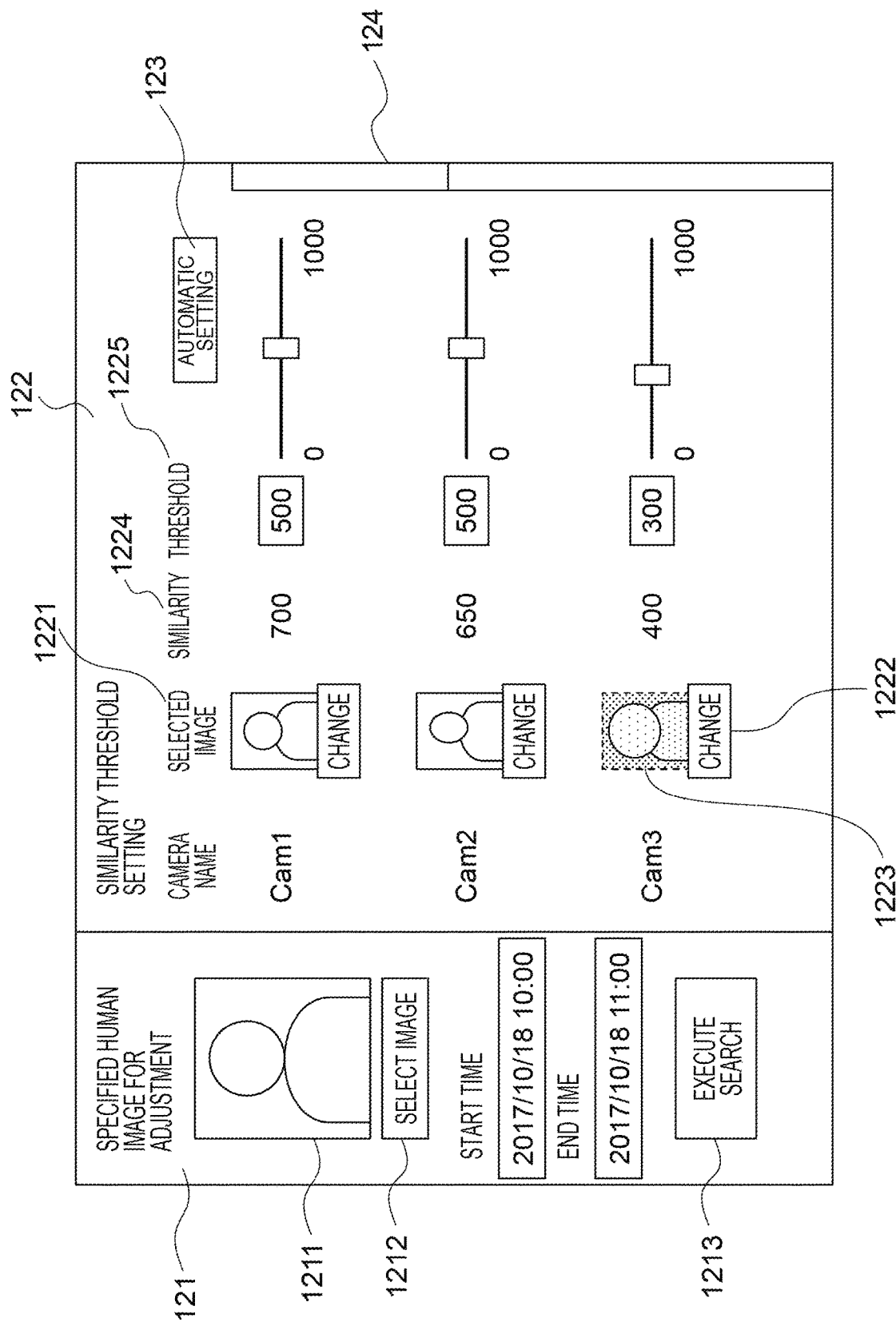

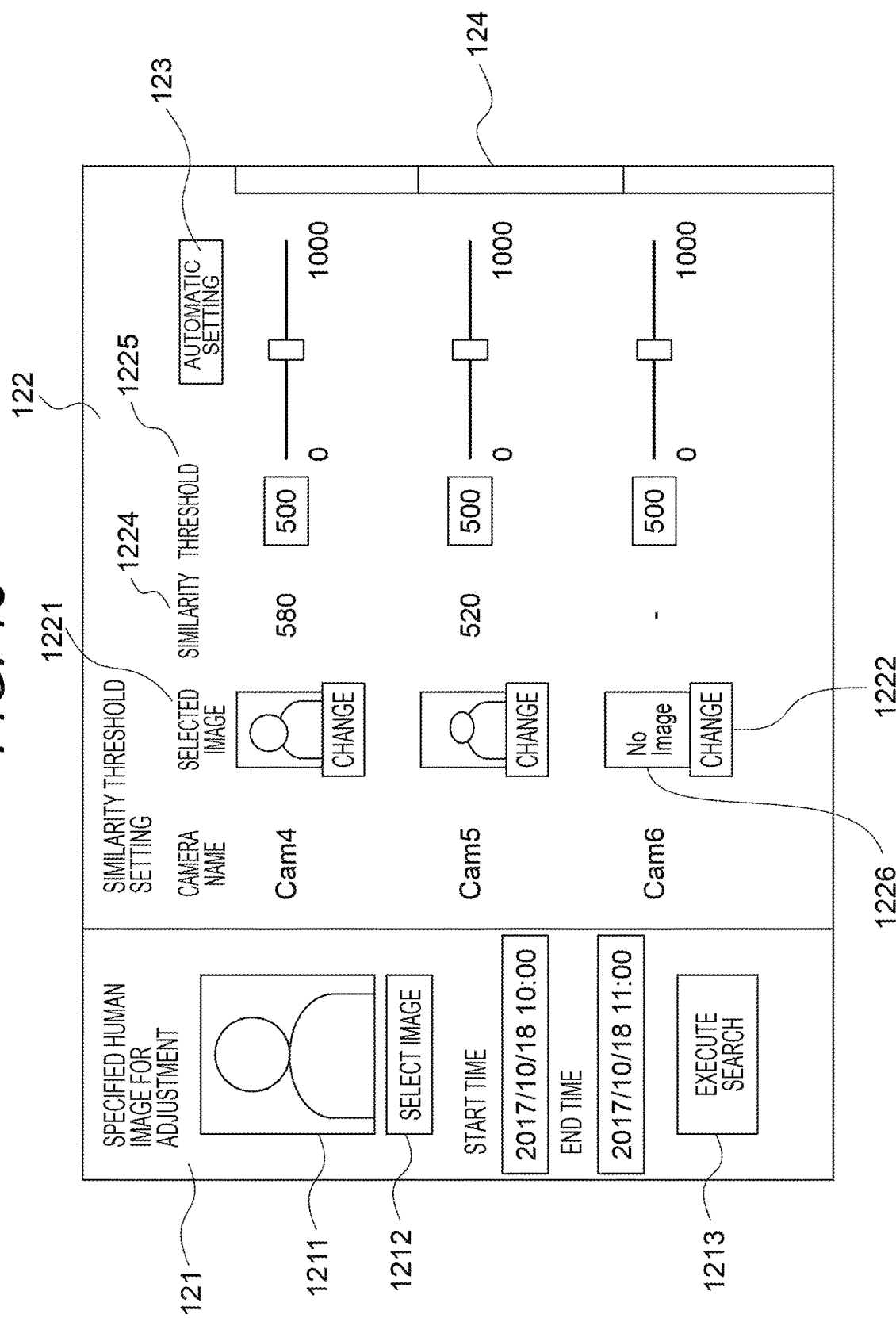

IMAGE PROCESSING DEVICE, IMAGE PROCESSING METHOD, AND PROGRAM

BACKGROUND OF THE INVENTION

Field of the Invention

The present invention relates to an image processing device, an image processing method, and a program.

Description of the Related Art

In recent years, a human search system has been proposed, in which multiple monitoring cameras placed in a monitoring area are connected to each other via a network to cooperate with each other and, e.g., a specific human or a stray can be searched from multiple images captured by these multiple cameras.

In the human search system of this type, the captured image of each of the multiple cameras is analyzed to detect a human body, and a feature amount indicating object features is extracted from the face of the detected human body or a human body image. The extracted feature amount is associated with information such as image capturing time, the camera having captured the image, and the image of the human body recognized as the human, and is registered as registration information on such a human in the human search system.

When the specific human etc. are searched, the feature amount is extracted from a search target image, and the feature amount of the extracted search target image and the feature amount of the registration information on multiple human registered in the human search system are collated. In such collation of the feature amounts, a similarity indicating likelihood that the registered human is the same as the specific human targeted for search is calculated, and the registration information on the human for which a similarity equal to or higher than a predetermined threshold has been calculated is searched. The registration information on the multiple human searched as described above is lined up in a similarity order or a detection time order, and is listed as search results on, e.g., a display device.

Japanese Patent Laid-Open No. 2009-27393 discloses the technique of updating features of a search target object by means of a search target object image selected by a user in a video image search system configured to acquire and hold input images from multiple cameras.

Specifically, the video image search system of Japanese Patent Laid-Open No. 2009-27393 has a condition specifying portion configured to specify a human feature, time, and a camera from the input images, an image search portion configured to search an image matching the conditions specified by the condition specifying portion from a held input image group, and a result display portion configured to display image search results. A user selects and inputs, in an interactive mode, appropriateness on whether or not a human image displayed on the result display portion is the same as a human specified by the condition specifying portion. The human feature of the image determined as correct by the user is updated in such a manner that such a human feature is added to or integrated with held human features.

According to the technique described in Japanese Patent Laid-Open No. 2009-27393, the user selects the appropriateness on whether or not the image displayed on the result display portion and having a high similarity is a search target human, and the human feature determined as correct is expanded. Thus, even for an image including the same human but having a different appearance, the accuracy of human search is improved.

However, in the human search system configured such that the multiple cameras cooperate with each other, an installation location for each camera varies in the monitoring area, and therefore, installation conditions such as the angle of view, illumination conditions, etc. are different among the cameras. Moreover, performance such as a resolution and a frame rate varies among the multiple cameras in many cases. For this reason, even for the captured image of the same human, a feature amount of an object whose image has been captured and shape information such as orientation varies among the multiple cameras.

Specifically, due to various image capturing condition differences such as environment with insufficient illuminance, low camera performance such as a resolution, and an unfavorable camera installation angle, there is a camera tending to have a low similarity in collation between the search target and the registered image. Thus, bias (an individual difference) in human search result output is caused among the multiple cameras.

When the search results are displayed, search results for which a similarity equal to or higher than a predetermined threshold has been calculated are listed as in the technique described in Japanese Patent Laid-Open No. 2009-27393. Thus, the search result of the camera tending to have a low similarity is sometimes omitted from the list, and is missed as a monitoring target even when the search result shows the same human. Thus, there is a probability that the accuracy of human search is lowered.

There is a need in the art to provide an image processing device, an image processing method, and a program for properly performing image search by means of captured images from multiple cameras regardless of a difference in image capturing conditions among the cameras.

SUMMARY OF THE INVENTION

For solving the above-described issues, a search result display processing method in a monitoring system is provided, the method including the specifying step of specifying a camera to be adjusted among multiple cameras based on the history of a similarity for an object searched from images captured by the multiple cameras, the calculation step of calculating similarities for the images captured by the multiple cameras with respect to the object of a search target, the addition step of adding an adjustment value to a similarity for an image captured by the specified camera among the similarities calculated at the calculation step, and the display processing step of performing the processing of displaying images in descending order of the similarity among the image having the similarity to which the adjustment value has been added at the addition step and an image captured by a camera different from the camera specified at the specifying step.

Further features of the present invention will become apparent from the following description of exemplary embodiments (with reference to the attached drawings).

BRIEF DESCRIPTION OF THE DRAWINGS

FIG. 4 is a table of one example of human information managed by a human search server according to the present embodiment.

FIG. 8 is a table of one example of human search results extracted by human information extraction processing of FIG. 7.

FIG. 12 is a view of one example of the display screen on which an instruction for similarity threshold adjustment is input for each camera.

FIG. 13 is a view of one example of the display screen after a scroll bar has been operated on the display screen of FIG. 12.

DESCRIPTION OF THE EMBODIMENTS

Figure 1:
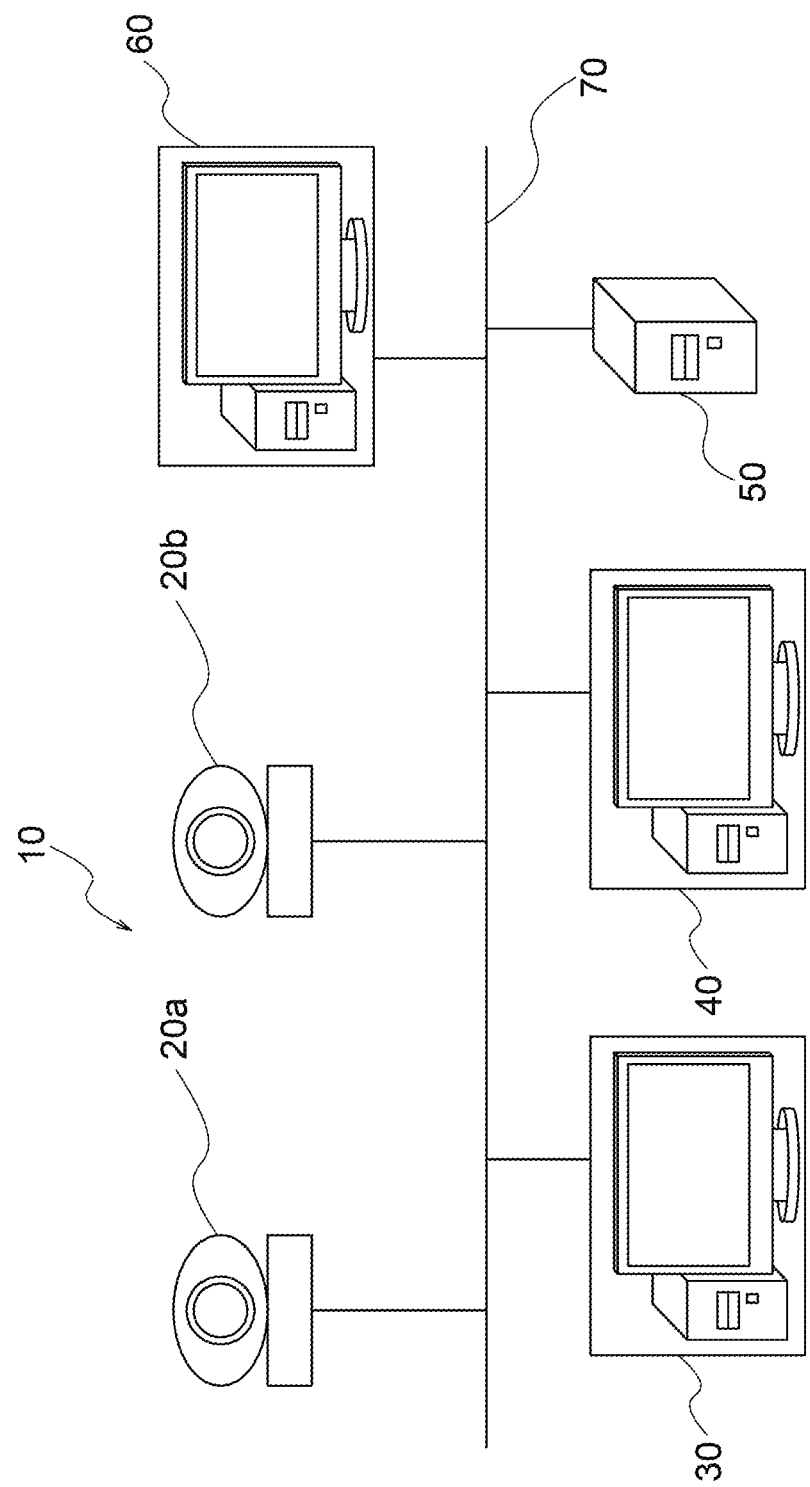
FIG. 1 is a diagram of one example of a network configuration of a human search system according to an embodiment of the present disclosure.

Hereinafter, an embodiment for implementing the present disclosure will be described with reference to the attached drawings. Note that the embodiment described below is one example as a technique for implementing the present disclosure, and needs to be corrected or changed as necessary according to a device configuration or various conditions to which the present disclosure is applied. The present disclosure is not limited to the embodiment below. Moreover, all combinations of features described in the present embodiment are not necessarily essential for solution of the present disclosure.

In the present embodiment, images captured by multiple image capturing devices are analyzed. When an image search result for a search target is output from image analysis processing results, the image capturing device having a lower similarity between the search target and a registered image than those calculated for other image capturing devices is identified. Then, in the present embodiment, the similarity calculated for the identified image capturing device can be adjusted such that the image captured by such an image capturing device is included in the output image search results. Moreover, when a low similarity is calculated, the identified image capturing device and the search result for the image captured by such an image capturing device can be notified in distinction from other image capturing devices and the image search results thereof.

With this configuration, bias in the image search results to be output among the multiple image capturing devices due to, e.g., a difference in image capturing conditions is adjusted. Thus, failure in output of the search results for the same human as the search target is reduced, and the accuracy of image search is improved.

Hereinafter, the "similarity" indicates, in the present embodiment, likelihood that a human registered as an image analysis result is the same as a specific human targeted for search. The similarity can be used as a threshold for determining whether or not output as an image search result is to be made, and in the present embodiment, can be set separately for each of the multiple image capturing devices.

Moreover, the "image capturing conditions" of the image capturing device include, but not limited to, installation conditions such as the angle of view, illumination conditions, and image capturing device performance such as a resolution and a frame rate in image capturing of the image capturing device, and include any conditions influencing analysis and search of a captured image and being different among the multiple image capturing devices. Note that in the present embodiment, the case of applying a network camera as the image capturing device for monitoring will be described below as an example, but the present embodiment is not limited to this case. The present embodiment is also applicable to other image search purposes. Moreover, in the present embodiment, a case where a captured image is analyzed to detect a human body and the same human as a human of a search target is searched from human registration information including a feature amount of the detected human body will be described below as an example, but the search target to which the present embodiment is applicable is not limited to above. The present embodiment is applicable to any object image search purposes including a moving object and a still object in a captured image.

Network Configuration of Present Embodiment

FIG. 1 is a diagram of one example of a network configuration in the case of applying a human search system according to the present embodiment to a network camera system.

A network camera system 10 of FIG. 1 includes at least two network cameras 20a, 20b, an image analysis server 30, a human search server 40, a network storage 50, and a search terminal device 60, The network cameras 20a, 20b, the image analysis server 30, the human search server 40, the network storage 50, and the search terminal device 60 are connected to each other via a network 70, thereby exchanging information with each other.

The network 70 may be, for example, a wired local area network (LAN) according to communication standards such as Ethernet (registered trademark). Alternatively, the network 70 may include a wireless network. The wireless network includes wireless personal area networks (PANs) such as Bluetooth (registered trademark), ZigBee (registered trademark), and Ultra WideBand (UWB). Moreover, the wireless network includes a wireless local area network (LAN) such as Wireless Fidelity (Wi-Fi) (registered trademark), and a wireless metropolitan area network (MAN) such as WiMAX (registered trademark). Further, the wireless network includes a wireless wide area network (WAN) such as LTE/3G. Note that communication standards, size, and configuration are not limited to above as long as the network 70 communicably connects each type of equipment.

The network cameras (hereinafter also simply referred to as "cameras") 20a, 20b are image capturing devices, such as monitoring cameras, configured to capture an image of an object at a predetermined angle of view. These cameras 20a, 20b can transmit, via the network 70, the captured images (hereinafter also simply referred to as "images") to the image analysis server 30, the human search server 40, and the network storage 50. Note that in FIG. 1, two cameras 20a, 20b are illustrated, but the number of cameras may be two or more and is not limited to the illustrated number.

The image analysis server 30 is configured to read, via the network 70, e.g., data of the captured images recorded in the network storage 50, thereby executing image analysis processing. Specifically, the image analysis server 30 detects a human body from the image acquired from the network storage 50, extracts a feature amount of the detected human body, generates human information including the feature amount of the extracted human body, and registers the human information in the network storage 50. The "human information" is information (object information) on a human recognized from an image, the information including image capturing time, an object ID, a camera ID, a feature amount of a human body detected from the image, an image (a human image) of the human body recognized as the human, and the attribute of the human. Details of the human information will be described later with reference to FIG. 4. Note that the entirety or part of the image analysis processing executed by the image analysis server 30 may be r counted on the cameras 20a, 20b.

The human search server 40 is configured to execute human search processing when human search is instructed from a user. Specifically, the human search server 40 extracts a feature amount of an input search target, collates the extracted feature amount of the search target and feature amounts of multiple human registered as the human information to calculate a similarity, and outputs, as a search result, a human for which a similarity equal to or higher than a predetermined threshold has been calculated.

The network storage 50 is a recording device configured to record information such as the captured images delivered from the cameras 20a, 20b, the human information transmitted from the image analysis server 30, the human search results transmitted from the human search server 40, and various types of control information. The network storage 50 functions as an external non-volatile storage device for the cameras 20a, 20b, the image analysis server 30, and the human search server 40. The entirety or part of the information recorded in the network storage 50 may be recorded in a local storage device for the cameras 20a, 20b, the image analysis server 30, and the human search server 40. In this case, the network storage 50 may be omitted as necessary.

The search terminal device 60 includes a display device (a display), and has the display control function of reproducing and displaying the images delivered from the cameras 20a, 20b and the images recorded in the network storage 50 and displaying, e.g., human search processing results described later on the display device. Moreover, the search terminal device 60 includes a user interface and an input unit for human search executed by the human search server 40, and transmits a human search processing request to the human search server 40 when the user instructs human search.

Further, the search terminal device 60 has the function of performing parameter setting operation, such as threshold setting, regarding the image analysis processing executed by the image analysis server 30 and the human search processing executed by the human search server 40.

Hardware Configuration of Network Camera

Figure 2:
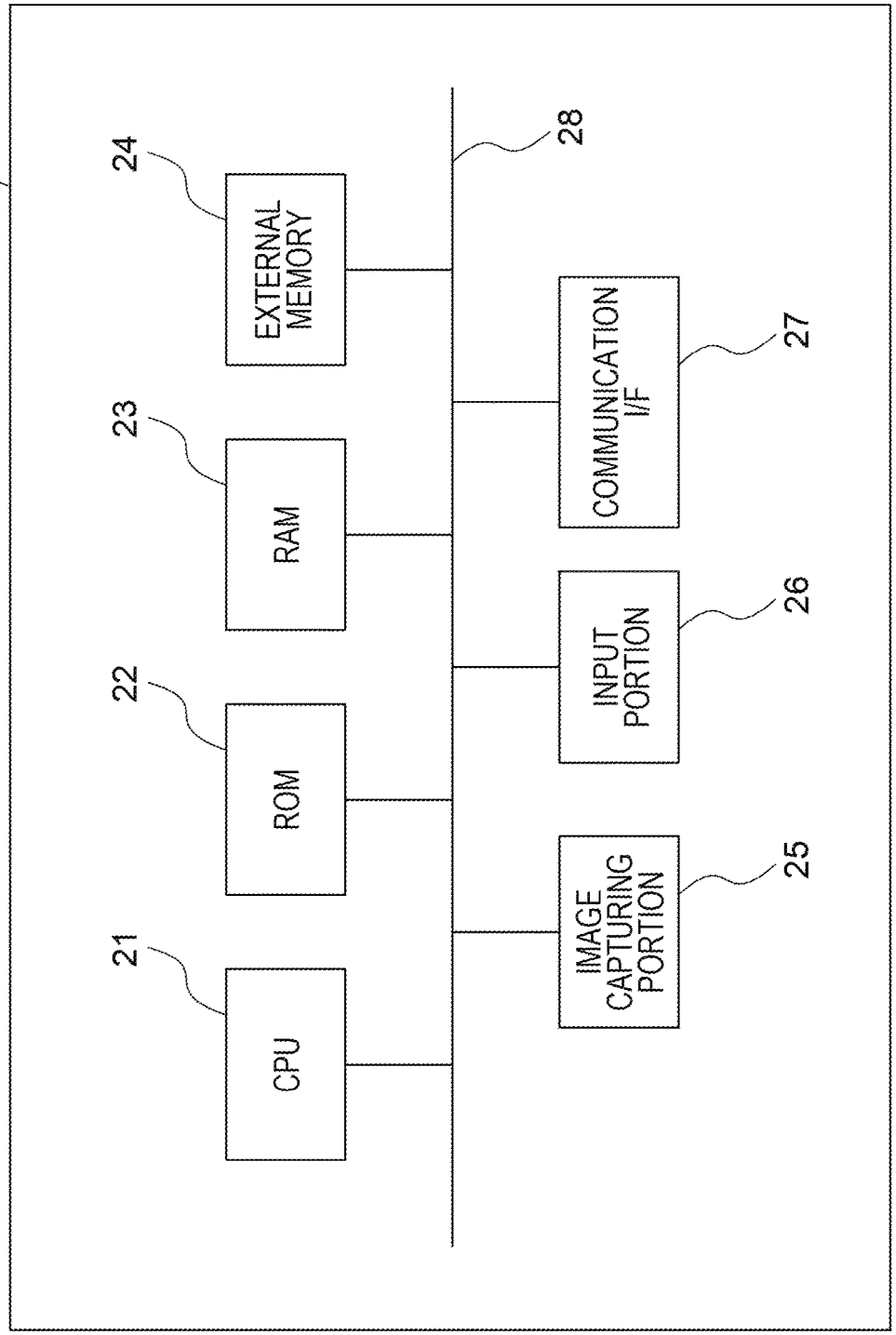
FIG. 2 is a diagram of one example of a hardware configuration of a network camera according to the present embodiment.

FIG. 2 is a diagram of one example of a hardware configuration of the camera 20a, 20b.

The camera 20a, 20b of FIG. 2 includes a CPU 21, a ROM 22, a RAM 23, an external memory 24, an image capturing portion 25, an input portion 26, a communication I/F 27, and a system bus 28.

The CPU 21 is configured to overall control operation in the camera 20a, 20b, and is configured to control each component (22 to 27) via the system bus 28.

The ROM 22 is a non-volatile memory configured to store, e.g., control programs necessary for execution of various types of processing by the CPU 21. Note that these control programs etc. may be stored in the external memory 24 or a detachable storage medium (not shown).

The RAM 23 functions as a main memory, a work area, etc. for the CPU 21. That is, the CPU 21 loads the necessary programs etc. from the ROM 22 into the RAM 23 upon execution of various types of processing, thereby executing the programs etc. to implement various types of functional operation.

The external memory 24 is, for example, configured to store various types of data, various types of information, etc. necessary for performing processing by means of the programs by the CPU 21. Moreover, the external memory 24 is, for example, configured to store various types of data, various types of information, etc. obtained by the processing performed by means of the programs etc. by the CPU 21.

The image capturing portion 25 includes, for example, a lens configured to capture an image of an object and an image capturing element. The lens is an optical lens configured to form, on the image capturing element, an image of incident light from an object targeted for image capturing, and is configured to focus the incident light on the image capturing element. The image capturing element is an element configured to convert light into an image signal, and may include a complementary metal oxide semiconductor (CMOS) and a charge coupled device (CCD), for example.

The input portion 26 includes a power supply button etc., and the user of the camera 20a, 20b can provide an instruction to the camera 20a, 20b via the input portion 26.

The communication I/F 27 is an interface for communication with an external device (e.g., the image analysis server 30) connected to the network 70, and is a LAN interface, for example. The system bus 28 communicably connects the CPU 21, the ROM 22, the RAM 23, the external memory 24, the image capturing portion 25, the input portion 26, and the communication I/F 27 to each other.

The function of each portion of the camera 20a, 20b illustrated in FIG. 2 is implemented in such a manner that the CPU 21 executes the program stored in the ROM 22 or the external memory 24.

Note that the image analysis server 30, the human search server 40, and the search terminal device 60 may include, with reference to FIG. 2, hardware such as the display device instead of the image capturing portion 25. The display device may include a monitor such as a liquid crystal display (LCD). Moreover, the image analysis server 30, the human search server 40, and the search terminal device 60 include, as the input portion 26, a keyboard or a pointing device such as a mouse, and the user can provide an instruction to each of the devices 30, 40, 60.

Functional Configuration of Network Camera System

Figure 3:
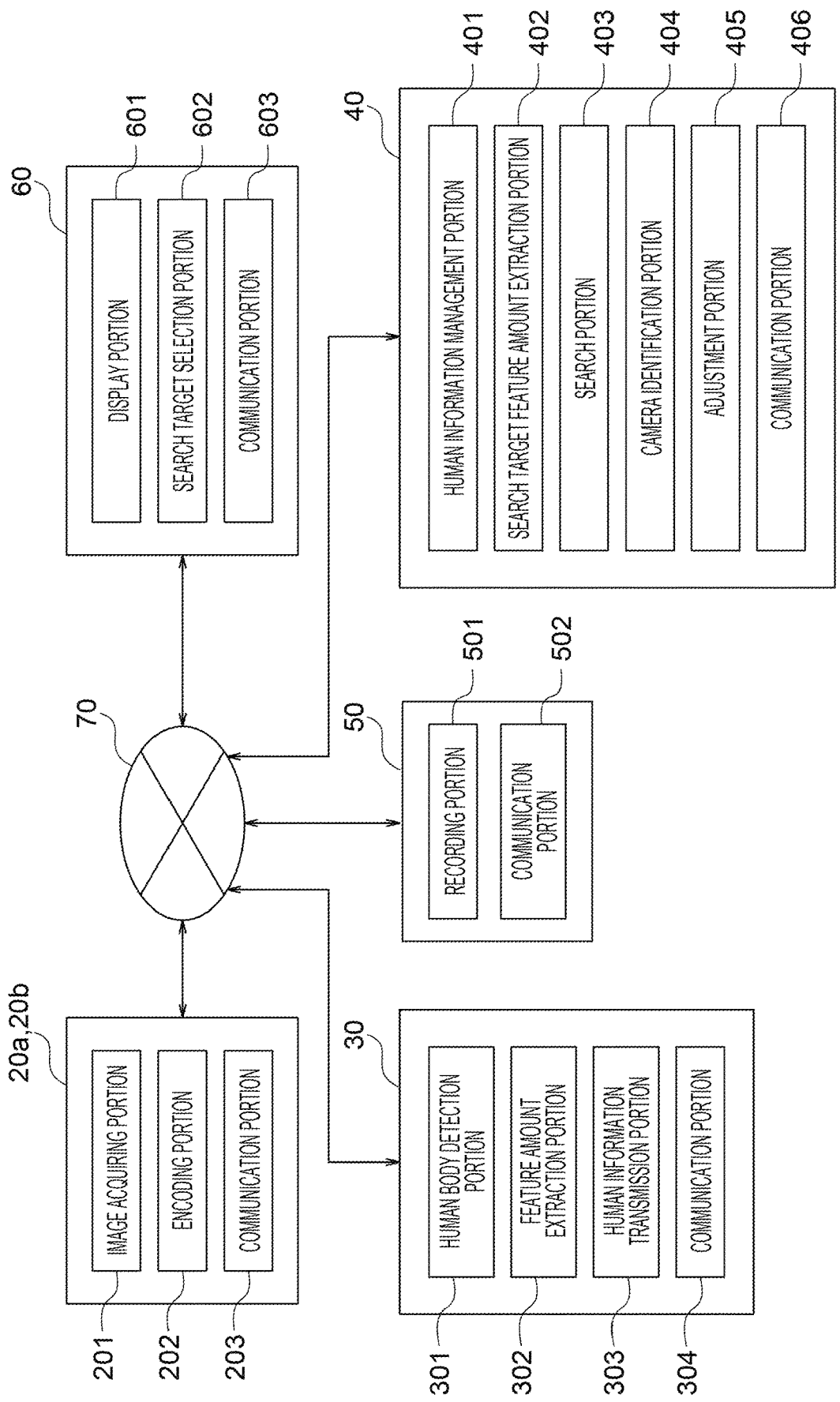
FIG. 3 is a diagram of one example of a functional configuration of each device forming the human search system according to the present embodiment.

FIG. 3 is a block diagram of one example of a functional configuration of each device forming the human search system according to the present embodiment.

Of function modules of each device illustrated in FIG. 3, functions implemented by software have programs for providing the function of each function module, the programs being stored in a memory such as the ROM. These functions are implemented in such a manner that the programs are read out to the RAM and executed by the CPU. For functions implemented by hardware, a dedicated circuit may be, by means of a predetermined compiler, automatically generated on a FPGA from the program for implementing the function of each function module, for example. The FPGA stands for a field programmable gate array. As in the FPGA, a gate array circuit may be formed, and may be implemented as the hardware. Alternatively, the hardware may be implemented by an application specific integrated circuit (ASIC). Note that the configuration of function blocks illustrated in FIG. 3 is one example. Multiple function blocks may form a single function block, or any of the function blocks may be divided into blocks for performing multiple functions.

The camera 20a, 20b includes an image acquiring portion 201, an encoding portion 202, and a communication portion 203. In the camera 20a, 20b, the image acquiring portion 201 is configured to acquire the captured image. The encoding portion 202 is configured to encode the image acquired by the image acquiring portion 201. The communication portion 203 is configured to deliver the image encoded by the encoding portion 202 to the network 70. The image delivered to the network 70 is transmitted to the network storage 50, the image analysis server 30, and the search terminal device 60.

The network storage 50 includes a recording portion 501 and a communication portion 502. In the network storage 50, the recording portion 501 is configured to record the image received by the communication portion 502 in the storage device. The communication portion 502 is configured to receive the image from the camera 20a, 20b via the network 70, thereby supplying the image to the recording portion 501.

The image analysis server 30 includes a human body detection portion 301, a feature amount extraction portion 302, a human information transmission portion 303, and a communication portion 304. In the image analysis server 30, the human body detection portion 301 is configured to detect a human body from the image recorded in the recording portion 501 of the network storage 50. Note that the human body detection portion 301 may utilize, for enhancing the accuracy of detection of the human body, results of human body tracking, face detection, and face tracking, for example.

The feature amount extraction portion 302 is configured to extract a feature amount of the human body detected by the human body detection portion 301. The human information transmission portion 303 is configured to associate, via the communication portion 304, the feature amount of the human body extracted by the feature amount extraction portion 302 with the image capturing time, the object ID, the camera ID, an image (a human image) of the human body recognized as a human, the attribute of the human, etc., thereby generating the human information. The generated human information is transmitted to the human search server 40 by the human information transmission portion 303.

The communication portion 304 is configured to transmit the human information supplied from the human information transmission portion 303 to the human search server 40 via the network 70. Note that the human information transmission portion 303 may transmit the generated human information to the network storage 50, and may record such information in the recording portion 501.

The human search server 40 includes a human information management portion 401, a search target feature amount extraction portion 402, a search portion 403, a camera identification portion 404, an adjustment portion 405, and a communication portion 406. In the human search server 40, the human information management portion 401 is configured to register and manage, in a storage device, the human information transmitted from the human information transmission portion 303 of the image analysis server 30 via the network 70. The search target feature amount extraction portion 402 is configured to receive, via the communication portion 406, a request for searching a human targeted for searching from the search terminal device 60 and detect a human body from an image specified by the received human search request, thereby extracting a feature amount of the detected human body as the feature amount of the human targeted for searching.

The search portion 403 is configured to search the human information managed and registered by the human information management portion 401. Specifically, the search portion 403 collates the feature amount, which is extracted by the search target feature amount extraction portion 402, of the human targeted for searching and the feature amount of the human information managed and registered by the human information management portion 401, thereby calculating, as the search result, the similarity between both of the feature amounts.

The camera identification portion 404 is configured to tabulate the similarity calculated by the search portion 403 for each of the cameras 20a, 20b, thereby identifying one or more cameras 20a, 20b for which a relatively-lower similarity than those of other cameras has been tabulated.

The adjustment portion 405 is configured to calculate an adjustment value for adjusting the thresholds of the similarities for the cameras 20a, 20b identified by the camera identification portion 404, thereby executing adjustment processing in output of the search results among the cameras. Details of inter-camera adjustment processing executed by the adjustment portion 405 will be described later with reference to FIG. 7.

The communication portion 406 is configured to receive the human information transmitted from the human information transmission portion 303 of the image analysis server 30 via the network 70, thereby supplying the received human information to the human information management portion 401. Moreover, the communication portion 406 is configured to receive the request for searching the human targeted for searching from the search terminal device 60, thereby supplying such a request to the search target feature amount extraction portion 402.

The search terminal device 60 includes a display portion 601, a search target selection portion 602, and a communication portion 603. In the search terminal device 60, the display portion 601 is configured to receive, via the communication portion 603, the images delivered from the cameras 20a, 20b, the images transmitted from the network storage 50, the human search results transmitted from the human search server 40, etc., and thereby displaying these images on the display device.

The search terminal device 60 further includes a user interface for specifying a human as the search target necessary when a search instruction is sent to the human search server 40.

Note that it has been described above that image processing devices such as the cameras 20a, 20b, the image analysis server 30, and the human search server 40 forming the human search system process images. However, in these image processing devices, processing contents are the same even when a video image is acquired and processed for each frame. Thus, these devices are also applicable as video image processing devices to the human search system.

A human image as the search target is input to the search terminal device 60. Specifically, the human image as the search target can be specified in such a manner that human images recorded in the network storage 50 are displayed by the display portion 601 and an image selected from the displayed human images by the user is used. Alternatively, an image held in advance by the user may be used. The search terminal device 60 may transmit the image selected via the user interface by the user to the image analysis server 30 via the communication portion 603, and may cause the image analysis server 30 to analyze the image held in advance.

FIG. 4 illustrates one example of a layout of the human information managed by the human information management portion 401 of the human search server 40. As illustrated in FIG. 4, the human information includes image capturing time 41 at which an image of a human body as a detection target has been captured, an object ID 42 for identifying an object in the image, a camera ID 43 for identifying one of the multiple cameras 20a, 20b, and a feature amount 44 extracted from the detected human body. Further, the human information includes a thumbnail 45 and attribute information 46. The thumbnail 45 is a thumbnail image of a human to be displayed on the display device. The thumbnail 45 may be held as part of the human information by the human information management portion 401. Alternatively, only the position of the human in the image may be stored in the human information, and the human information management portion 401 may acquire, when the thumbnail needs to be displayed, a corresponding image from the recording portion 501 of the network storage 50 and generate the thumbnail by cutting out the human position from the acquired image.

The attribute information 46 includes, for example, the age (the age group), sex, and appearance feature of the human recognizable from the human image.

Human Information Registration Processing Flow
of Present Embodiment

Figure 5:
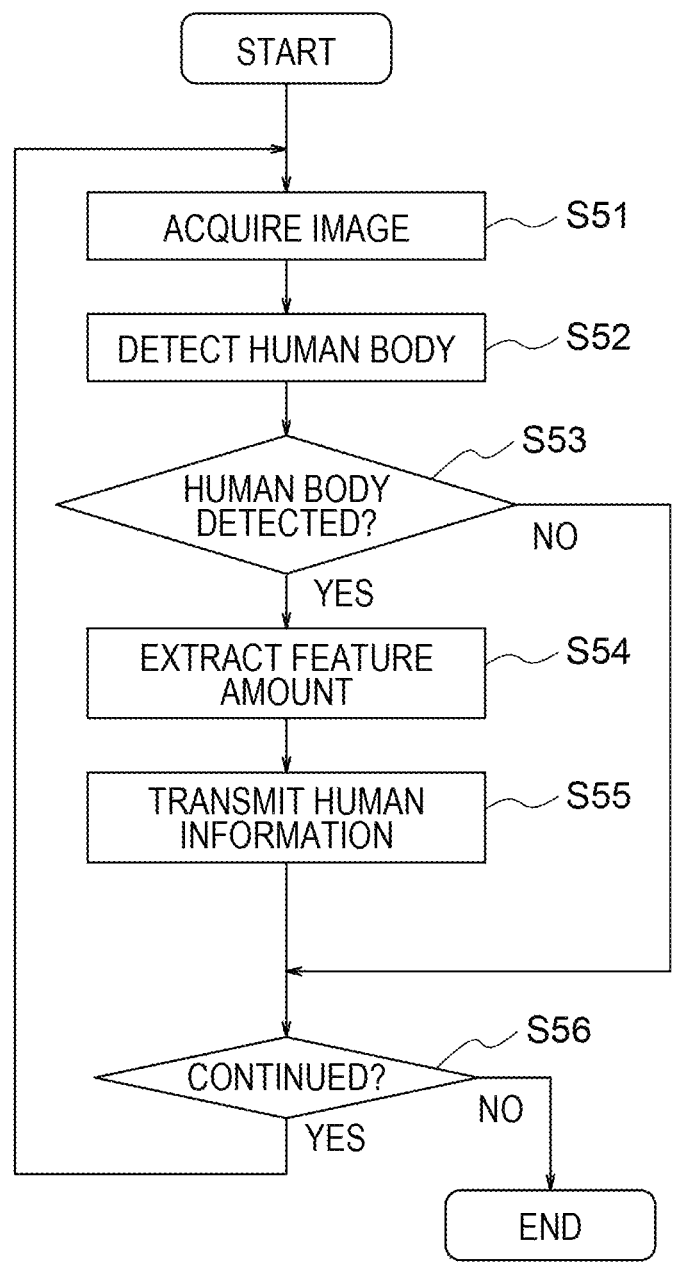
FIG. 5 is a flowchart of one example of a human information registration processing procedure according to the present embodiment.

FIG. 5 is a flowchart of a registration processing procedure for the human information illustrated in FIG. 4, the processing being executed by the image analysis server 30.

The processing illustrated in FIG. 5 may begin, for example, when a communication function of the image analysis server 30 is activated and the image analysis server 30 is brought into a state communicable with other communication devices via the network. Note that the timing of starting the processing illustrated in FIG. 5 is not limited to above.

The image analysis server 30 can execute the processing illustrated in FIG. 5 in such a manner that the CPU 21 reads out the necessary program from the ROM 22 or the external memory 24 and executes such a program. Note that the processing of FIG. 5 may be implemented in such a manner that at least some of the elements illustrated in FIG. 5 operate as dedicated hardware. In this case, the dedicated hardware operates based on the control of the CPU.

At S51, the communication portion 304 of the image analysis server 30 receives image data transmitted from the camera 20a, 20h or the network storage 50. The received image data is expanded and decoded in the image analysis server 30, and is acquired as an image (a moving image or a still image) targeted for human body detection. The image acquired at S51 is sequentially transmitted to the human body detection portion 301.

Note that an image supply source for the image analysis server 30 is not specifically limited, and may be a server device or a recorded video image management device configured to supply an image via or not via a wire or other image capturing devices than the cameras 20a, 20b. Alternatively, the image analysis server 30 may acquire an image as necessary from the memory (e.g., the external memory 24) in the image analysis server 30. Hereinafter, a case where a single image is processed by the image analysis server 30 will be described regardless of the case of acquiring a moving image or a still image by the image analysis server 30 at S51. In the former case, the single image is equivalent to each frame forming the moving image. In the latter case, the single image is equivalent to the still image.

At S52, the human body detection portion 301 of the image analysis server 30 uses, e.g., a collation pattern dictionary prepared in advance to execute human body detection processing for the image acquired at S51. Note that the human body detection portion 301 may have the function of detecting a region of the entire human body from the image, and the human body detection processing to be executed is not limited to pattern processing.

Other human body detection methods may include a method described in US Patent Publication No. 2007/0237387, for example. Specifically, according to this method, a detection window with a predetermined size is scanned on an input image, and two-class discrimination for determining whether or not a pattern image as a cutout image in the detection window is a human body is performed for the pattern image. In such discrimination, many weak discriminators are effectively combined using AdaBoost (adaptive boosting) to form a discriminator. This improves discrimination accuracy. Moreover, these discriminators are connected in series to form a cascade detector.

The weak discriminator has a histograms-of-oriented-gradients (HOG) feature amount. On the other hand, the cascade detector first remove pattern candidates which are obviously not objects by means of the simple discriminator at a preceding stage, and then, performs, only for other candidates, discrimination for determining whether or not the image is the human body by means of the complicated discriminator having a higher discrimination capability at a subsequent stage.

By application of the above-described method, the human body region can be detected from the moving image (a video image).

The region in the image as a target for execution of the human body detection processing by the human body detection portion 301 is not necessarily the entirety of the image transmitted from the camera 20a, 20b or the network storage 50. For example, the human body detection processing may be executed only for a human body detection processing region set by a parameter of a predetermined value in advance. Alternatively, the maximum and minimum sizes of the human body as the detection target may be specified by parameter setting, and the human body detection processing may not be executed for a region outside such a range. As described above, part of the human body detection processing or the region is omitted so that the human body detection processing can be speeded up.

Parameter setting as described above can be implemented by processing parameter setting for the human body detection portion 301, and such a processing parameter can be set via the image analysis server 30 or the user interface of the search terminal device 60, for example.

Moreover, the method for acquiring the entire body region of the object by the human body detection portion 301 is not necessarily the above-described method for initially acquiring the entire body region. For example, the human body detection portion 301 may first estimate the entire body region from a position obtained using, e.g., head detection, upper body detection, or face detection, thereby acquiring entire body region information.

For example, in face detection processing, e.g., edges of the eyes and the mouth are detected from the image, and in this manner, a characteristic portion of the face of the human body is detected. That is, in face detection processing, a face region is detected from a face position, a face size, face likelihood, etc.

For example, the longitudinal length of an upper body region detected in upper body detection may be simply extended downward of a screen by a predetermined number of times, and in this manner, the entire body region may be estimated and acquired. The predetermined number of times may be a fixed value, or may be variably set according to, e.g., a camera installation condition.

Note that in a crowded place image in which many human bodies are present in a captured image, there are overlaps of the human bodies in many cases. In this case, head detection, upper body detection, etc. resulting in less hidden portions and less detection failure even under a crowded situation are preferred.

At S53 of FIG. 5, in the human body detection processing of S52, it is determined whether or not the human body has been detected from the acquired image. When the human body has been detected at S52 (S53: Y), the processing proceeds to S54. On the other hand, when the human body cannot be detected at S52 (S53: N), the processing proceeds to S56.

In a case where the human body can be detected from the acquired image, the feature amount extraction portion 302 of the image analysis server 30 extracts, at S54, a feature amount of the human body from the human body image detected at S52. The feature amount to be extracted may include, for example, the positions of organ characteristic points such as the eyes, the nose, the cheeks, the mouth, and the eyebrows forming the face, the luminance of the vicinity of the organ characteristic points, a positional relationship among the organ characteristic points, the average color, average luminance, most frequent luminance, and texture of clothes, a body shape, and a gait.

After the feature amount has been extracted for all human bodies detected from the image at S54, the human information transmission portion 303 of the image analysis server 30 generates, at S55, the human information from the human body feature amount extracted at S54, thereby transmitting the generated human information to the human search server 40 via the communication portion 304. The human information generated at S55 and transmitted to the human search server 40 includes, as illustrated in FIG. 4, information regarding the human, such as the human body feature amount, the human image (the thumbnail), and the human attribute information, and accompanying information such as the ID of the camera having captured the image. The human search server 40 receives the human information transmitted from the image analysis server 30, and the received human information is registered and managed by the human information management portion 401 of the human search server 40.

At S56, the image analysis server 30 determines whether or not human information registration processing of FIG. 5 is to be continued. For example, it may be determined whether or not the processing is to be continued according to whether or not a processing end instruction has been received from the user. When the image analysis server 30 determines that the processing is to be terminated (S56: Y), the present processing ends: On the other hand, when the image analysis server 30 determines that the processing is to be continued (S57: N), the processing returns to S51, and is continued. Each type of processing in the human information registration information of FIG. 5 ends through the above-described processing.

Human Search Processing Flow of Present Embodiment

Figure 6:
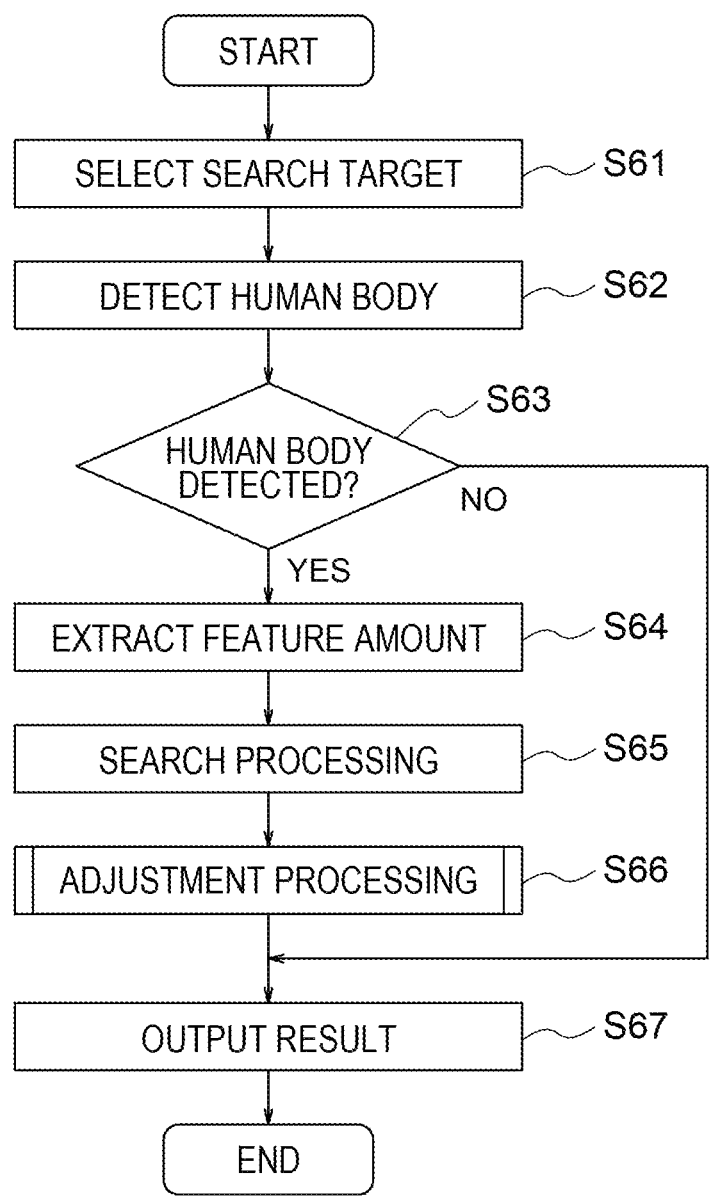
FIG. 6 is a flowchart of one example of a human search processing procedure according to the present embodiment.

FIG. 6 is a flowchart of a human search processing procedure executed by the human search server 40. The processing illustrated in FIG. 6 may begin, for example, when a communication function of the human search server 40 is activated and the human search request is received from the search terminal device 60. Note that the timing of starting the processing illustrated in FIG. 6 is not limited to above.

At S61, a human image targeted for searching is selected. Specifically, the human images recorded in the network storage 50 are displayed on the display device of the search terminal device 60, and the user selects the human image targeted for searching from the human images displayed on a user interface of the search target selection portion 602. The human search server 40 receives the image selected from the search terminal device 60, and the processing proceeds to S62.

At S62, the search target feature amount extraction portion 402 of the human search server 40 first executes the human body detection processing for the image acquired at S61.

At S63, in a case where a human body has been detected from the image (S63: Y), the processing proceeds to S64, and the search target feature amount extraction portion 402 extracts a feature amount of the human body as the search target detected at S62. On the other hand, in a case where no human body is detected from the image at S63 (S63: N), the processing proceeds to S67.

An example where the human body detection processing and feature amount extraction processing are executed by the human search server 40 has been described above, but the present embodiment is not limited to above. For example, it may be configured such that the human body detection function and the feature amount extraction function of the image analysis server 30 can be utilized from the search terminal device 60 or the human search server 40, and at S62 and S64, these functions of the image analysis server 30 may be called from the human search server 40. It is enough to call a function of an optional device configured so that the human body detection processing or the feature amount extraction processing can be performed, and such processing may be executed by other devices than those having the above-described functions in the image analysis server 30.

Alternatively, when the image selected at the search terminal device 60 at S61 is an image for which the human body has been already detected and the feature amount has been already extracted by the image analysis server 30, the human information management portion 401 may acquire the feature amount of the human targeted for searching from the human information on such a registered human. In this case, S62 to S64 are not necessary, and therefore, can be omitted.

At S65, the search portion 403 executes the human search processing by means of the feature amount of the human as the search target extracted or acquired at S64.

Specifically, the search portion 403 collates the feature amount of the human as the search target extracted at S64 and the feature amount already registered in the human information to calculate the similarity between these amounts, and returns, as the human search result, the human information including the registered human for which the calculated similarity is equal to or higher than the predetermined threshold.

At S66, the adjustment portion 405 adjusts a threshold for the output (the display) of the human search result obtained at S65.

The multiple cameras 20a, 20b placed in a monitoring area are different from each other in installation conditions such as the angle of view, illumination conditions, and image capturing conditions such as camera performance, and therefore, the camera tending to have a lower similarity than those of other cameras is present.

For this reason, when an attempt is, at a stage at which the human search result is obtained at S65, made to directly list the human search results from the images captured by the multiple cameras 20a, 20b, the result of the camera 20a, 20b tending to have a relatively-lower similarity is omitted from the list. That is, even when the image captured by the camera 20a, 20b having a relatively-low similarity includes the same human as the human targeted for searching, such a human is omitted from the list, and therefore, is missed. On the other hand, in the present embodiment, a similarity difference calculated among the cameras is, at S66, adjusted before output of the human search result, and therefore, biased frequency of the display of the search result for the human targeted for searching is reduced. Details of detection result adjustment processing will be described later with reference to FIG. 7.

At S67, the search portion 403 of the human search server 40 lines up, with reference to the similarity threshold obtained at S66 and adjusted among the cameras, the search results according to, e.g., a similarity order or an image capturing time order, thereby displaying the list. Moreover, the search portion 403 performs the control of displaying, with reference to the set predetermined similarity threshold, only the search results for which a similarity equal to or higher than the threshold has been calculated. This similarity threshold may be basically set in advance for the system, but the user can change the similarity threshold to an optional value.

Alternatively, the similarity threshold may be displayed with reference to a threshold set for each camera after execution of the later-described adjustment processing, or may be changed for each camera on the display screen.

Figure 7:
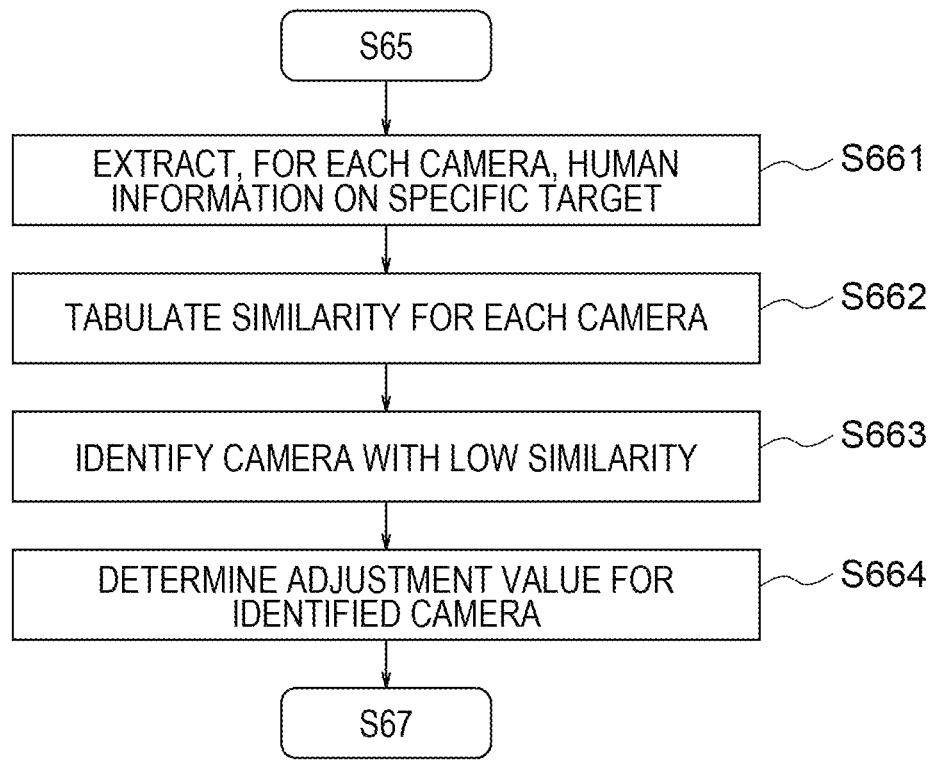
FIG. 7 is a flowchart of one example of a detailed procedure of adjustment processing of FIG. 6.

Each type of processing of the flowchart of FIG. 7 ends through the above-described processing.

Details of Inter-Camera Adjustment Processing

FIG. 7 is a flowchart of a search result adjustment processing procedure executed among the cameras by the human search server 40.

At S661, the adjustment portion 405 of the human search server 40 extracts, for each of the cameras 20a, 20b, the human information on a specific target for similarity adjustment from the human information managed by the human information management portion 401 and illustrated in FIG. 4. For example, the human information having a relatively-high similarity to the feature amount of the human as the search target selected at S61 can be, as the specific target, extracted from the human information managed by the human information management portion 401.

FIG. 8 illustrates one example of a table obtained as a result of extraction of the human information executed at S661. The table of FIG. 8 includes a group of an object ID 81, a camera ID 82, and the similarity between the specific target set at S661 and the object, the similarity being calculated for the camera. The similarity illustrated in FIG. 8 is a value of 0 to 1000, and indicates a higher similarity as the value increases. For each of the multiple cameras 20a, 20b, the processing of S661 is executed.

At S662, the adjustment portion 405 calculates the average of the similarities for each camera by means of extraction results obtained at S661. This average can be calculated using values within the top 10 of the extraction results of FIG. 8, for example. Alternatively, the number of extraction results used for calculation of the average is not within the top 10 of the similarities, but only the top similarity may be used, for example. Alternatively, targets for calculation of the average may vary according to the number of specific target extraction results, such as use of the top 10 percent of the number of specific target extraction results for each camera. As described above, the number of extraction results used for calculation of the similarity may be determined such that the number of extractions from the camera or the rate of extraction from the camera is equal among the cameras. Alternatively, all of the extraction results obtained at S661 may be used to calculate the average of the similarities for each camera.

At S663, the camera identification portion 404 of the human search server 40 identifies one or more of the multiple cameras having a relatively smaller average of the similarities than those of other cameras. Specifically, the camera identification portion 404 determines whether or not the average of the similarities calculated for each camera at S662 is lower than the average of the similarities for all cameras by a value equal to or greater than a predetermined value, thereby specifying the camera having a low similarity. The average of the similarities for all cameras can be calculated by execution of the processing of S662 for all cameras. Alternatively, at S663, the average of the similarities for a single camera and the average of the similarities for all other cameras may be compared to each other.

At S664, the adjustment portion 405 determines a similarity adjustment value (an additional value) to be added to the output value of the similarity for the camera identified at S663. The similarity adjustment value determined at S664 can be, for example, determined to such a value that a difference between the output value of the similarity for the camera specified at S663 including the similarity adjustment value and the average of the similarities for all cameras is within a range. Correction for adding the determined similarity adjustment value to the average of the similarities for the camera identified at S663 is made so that non-displaying of the search results for such a camera can be reduced.

Alternatively, in the present embodiment, the similarity threshold as a threshold for determining whether or not the human search result is to be displayed at S67 can be separately set for the cameras 20a, 20b. The search portion 403 may compare the similarity threshold set separately for the cameras as described above to the similarity obtained as a result of human search, thereby performing the display control of displaying, on the display device, only the human search results exceeding the similarity threshold. In this case, the similarity threshold is, in displaying, lowered for the camera 20a, 20b having a low similarity, and therefore, non-displaying of the search results for such a camera can be reduced. The decrement of the similarity threshold in this case may be, for example, set to such an extent that the difference between the average of the similarity output values for the camera identified at S663 and the similarity average for all cameras is within a predetermined range.

Note that an example where calculation of the similarity average and calculation of the adjustment value are executed with a single human being specified as the specific target has been described above, but multiple human may be specified as the specific targets at S661.

In a case where them multiple human are the specific targets as described above, the adjustment portion 405 may calculate, at S662, the similarity average for each human specified as the specific target, and calculate the similarity average for such a camera from the similarity average for the multiple human. Moreover, at S663, the similarity average for all cameras and the similarity average for each camera may be compared to each other, and the camera identification portion 404 may execute the processing as in the case of a single human.

Note that at S661, the multiple human different from each other in attribute are preferably specified as the specific targets. This is because it is assumed that a human attribute difficult to be detected according to the image capturing conditions of the installed camera is different among the multiple cameras. Specifically, bias such as a difficulty in obtaining a feature amount of a human wearing dark color clothes by a certain camera and a difficulty in obtaining a feature amount of a short human due to other cameras attached at high positions might be different according to attribute. In this case, the attribute (a face, an entire body, the color of clothes, etc.) difficult to be acquired by the camera is determined for each camera, and may be notified to the user.

When the multiple human different from each other in attribute are specified as the specific targets as described above, non-displaying of the search result by the camera, which is difficult to search the human, in the list of the search results for the multiple cameras can be reduced.

Each type of processing of the flowchart of FIG. 7 ends through the above-described processing.

An example where the similarity average for each camera is utilized at S663 has been described above, but the present embodiment is not limited to above. For example, a maximum value at which the similarity for each camera is the maximum may be utilized instead of the average, or the camera to be adjusted or the adjustment value therefor may be determined based on whether or not the average deviation or standard deviation of the similarity for each camera is equal to or greater than a predetermined value.

Moreover, an example where the adjustment value is, at S664, added to the similarity for the camera identified at S663 and the similarity which the adjustment value has been added is displayed has been described above, but the present embodiment is not limited to above. For example, the camera identified at S663 may be, without automatically adding the adjustment value, displayed as the camera from which it is difficult to obtain the search result on the display device of the search terminal device 60, and in this manner, such a camera may be notified to the user.

Further, the degree of difficulty in obtaining the search result by the camera may be also displayed on the display device, and the user may select, according to such a degree, displaying/non-displaying of data with the adjusted search result. Alternatively, for alerting the user, even when the camera identified at S663 has a low similarity, the detection result of such a camera may be preferentially displayed as the search result in, e.g., a separate frame in displaying so that such a detection result and other detection results can be distinguished from each other.

Moreover, the adjustment processing executed by the adjustment portion 405 has been described above as a flow along with the human search processing using, as a trigger, the user's human search request, but the present embodiment is not limited to above. For example, the adjustment processing may be executed in advance independently of the human search processing.

In this case, in a state in which the human information is accumulated to a certain degree before the user issues the human search request, an image of an object optionally selected from the human information managed by the human information management portion 401 may be set as the specific target of S661, and the adjustment processing may be executed multiple times. As described above, the camera tending to have a low similarity can be identified in advance of the human search processing.

Alternatively, only the human information identified as the same human may be set as the specific target of S661, and may tabulate the similarity for each camera at S662. In this case, it is guaranteed that the human as the specific target and the human compared to the specific target at S662 are the same human. Thus, the output value of the similarity for each of the multiple cameras may be adjusted at S664 such that the similarity average targeted for the specific target becomes equal among the cameras, i.e., the similarities for the multiple cameras are within a predetermined range. Thus, a bias of the output values of the similarities for all of the cameras having captured the specific target and having detected the feature amount can be flattened.

For acquiring, from the human information managed by the human information management portion 401, only the human information on specific human guaranteed as the same human as described above, multiple candidate images considered as the same human may be presented on the screen of the display device in the search terminal device 60, for example. As described above, the user interface allowing the user to select the same human from the presented candidate images is provided, and therefore, it is guaranteed that the human set as the specific targets are the same human.

Further, in the human search system, a mode for sequentially movably capturing only an image of the same human among the multiple cameras to guarantee the same human may be provided as an inter-camera adjustment mode, and the human information recorded during the inter-camera adjustment mode may be set as the specific target. As long as the human information on the same human as the human as the specific target can be extracted from the human information on multiple human managed by the human information management portion 401, the method is not limited to above, and other methods may be used. For example, human images of the same already-registered human which has passed may be manually selected by the user. Alternatively, a tracking portion configured to track a human among the multiple cameras may be provided to set the human identified by the tracking portion as the specific target.

GUI Example of Search Target Input and Human Search Result Output

One example of a graphical user interface (GUI) provided by the search terminal device 60 in the present embodiment will be described in detail with reference to FIGS. 9 to 13.

Figure 9:
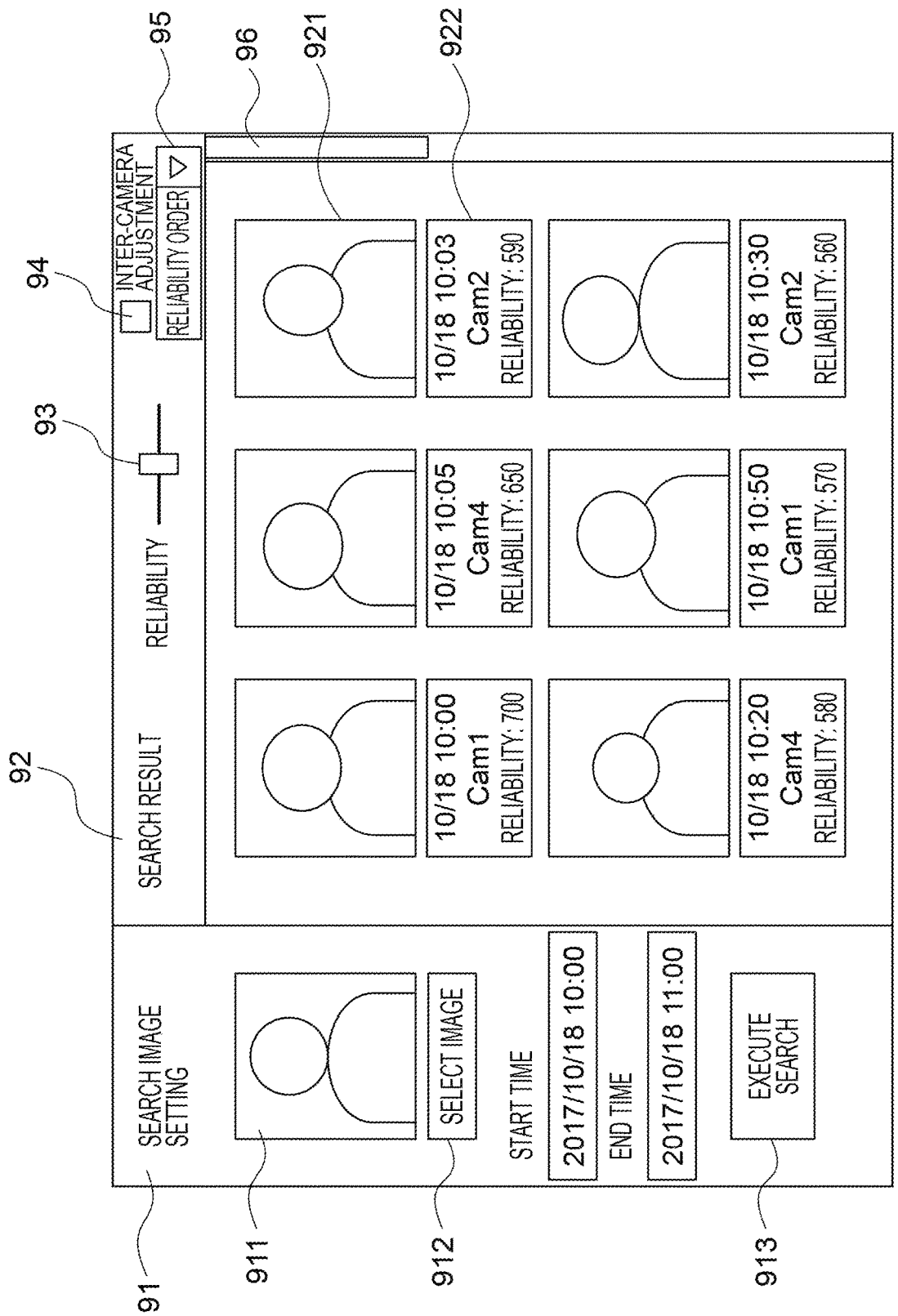
FIG. 9 is a view of one example of a display screen for displaying processing results of human search processing.

FIG. 9 illustrates an example of displayed search results in human search before the inter-camera adjustment processing (FIG. 7) for the search results in the present embodiment is executed.

In FIG. 9, a search image setting region 91 configured to set an image of the search target includes a search image checking region 911 for checking a human image currently set as the search target, and an image selection button 912, and a search start button 913.

A search result display region 92 configured to display the search results in human search includes a region where multiple human images 921 as the search results and detailed information 922 on multiple human corresponding to the human images can be displayed as a list.

In the search result display region 92, a reliability threshold adjustment slider 93, an inter-camera adjustment switch 94, a display order designation column 95, and a scroll bar 96 are provided. The reliability threshold adjustment slider 93 is a slider configured to variably adjust a reliability for filtering human to be displayed in the search result display region 92 from the search results in human search. In FIG. 9, the reliability is an index for certainty that each human displayed in the search result display region 92 is the same as the human set as the search target. The value of the reliability to be displayed as the detailed human information 922 of the search result display region 92 can be associated with the value of the similarity calculated by the human search server 40, or can use such a similarity value.

The inter-camera adjustment switch 94 is a switch configured to manually instruct activation of the inter-camera adjustment processing to the adjustment portion 405 of the human search server 40.

When the user activates human search, an image of the search target is first specified in the search image setting region 91. When the image selection button 912 is pressed, another screen for selecting the image of the search target can be displayed, and the user specifies an optional image of the search target on this search target image selection screen. The image specified herein may be specified from the list of previous human search result images, or an optional human image for which the human information has been registered may be specified, for example.

The user can further input, as search conditions, a search time range etc. in the search image setting region. After the necessary search conditions have been input, the user presses the search start button 913 to instruct the human search server 40 to start human search.

In the human search server 40, when a series of human search processing illustrated in FIG. 6 is executed, the search result display region 92 displays the list of the human images 921 of the candidates matching the search conditions specified by the user and the detailed information 922 on the human. The detailed information 922 to be displayed together with the human images 921 in the search result display region 92 can be acquired from the entirety or part of the human information on the human, and may further include the reliability obtained from the similarity calculated for the human. In FIG. 9, a reliability order is displayed in the display order designation column 95, and indicates that the search results are displayed in descending order of the reliability in the search result display region 92. The descending and ascending orders may be switchable.

FIG. 9 illustrates the example where a reliability threshold is set to 500, and only the human as the search results calculated as a reliability (a similarity) equal to or higher than 500 are displayed from the search results in the search result display region 92.

The inter-camera adjustment switch 94 is turned ON so that an instruction for switching between displaying of the search results subjected to inter-camera adjustment and displaying of the non-adjusted search results can be provided to the human search server 40.

Figure 10:
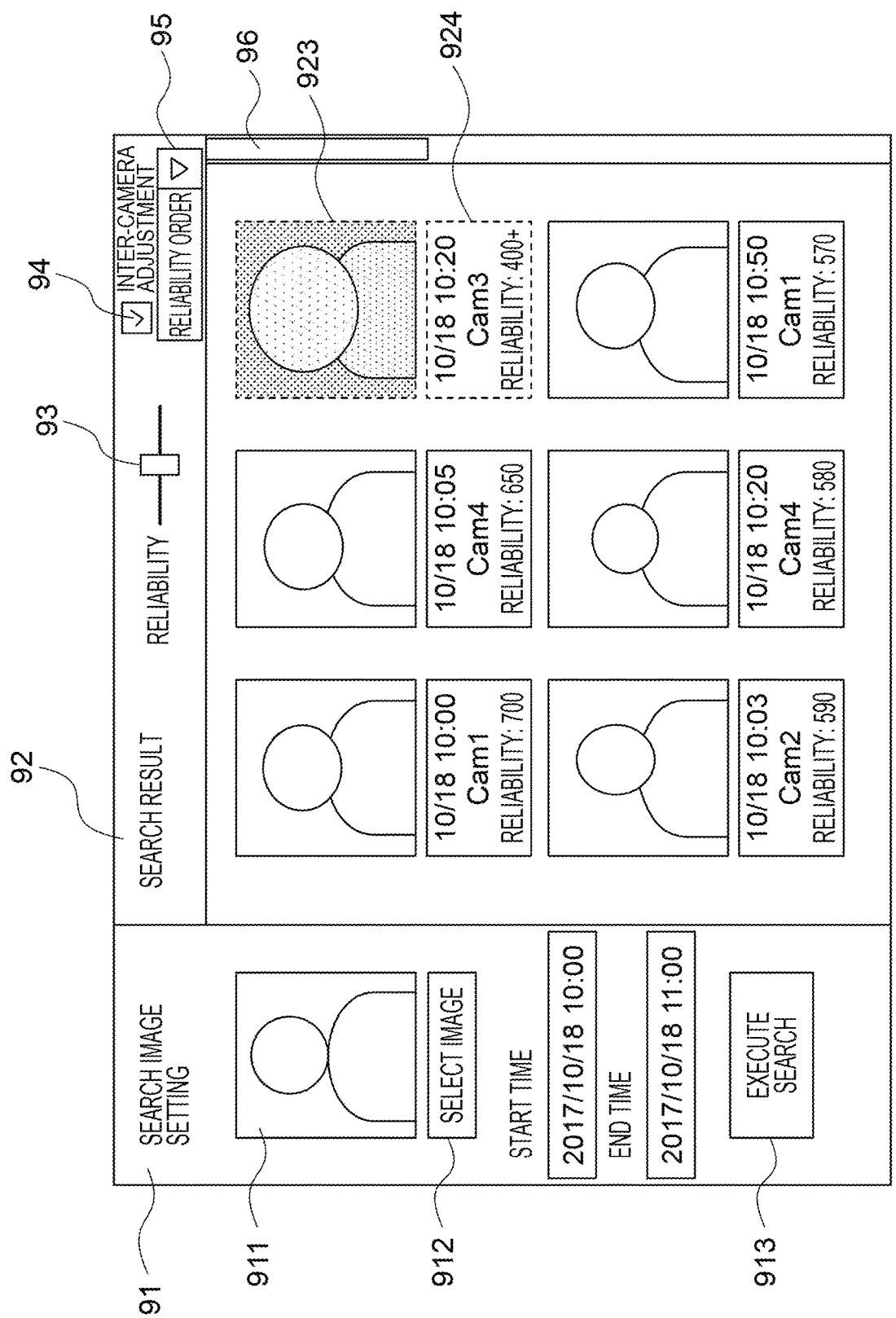
FIG. 10 is a view of one example of the display screen after inter-camera adjustment has been instructed on the display screen of FIG. 9.

FIG. 10 illustrates a display example after the inter-camera adjustment switch 94 has been turned ON to execute the inter-camera adjustment processing in FIG. 9.

In comparison with FIG. 9, a new human image 923 and corresponding detailed information 924 are, in FIG. 10, displayed in the search result display region 92 because the inter-camera adjustment switch 94 has been turned ON. In a region of the detailed information 924, the reliability is displayed as "400+."

Since a reliability (a similarity) of 400 for the human image 923 falls below a reliability threshold of 500, the human image 923 captured by a camera "Cam3" and the corresponding detailed information 924 are not supposed to be displayed. However, since the inter-camera adjustment switch 94 is operated, the human image 923 captured by the camera "Cam3" and the corresponding detailed information 924 are displayed as a new candidate human image although the threshold falls below a set reliability threshold of 500. In the detailed information 924, e.g., "+" is added to the reliability so that the user can be visually recognized that the displayed human image 923 is newly displayed as a result of execution of the inter-camera adjustment processing.

Further, in FIG. 10, an image display frame of the human image 923 and a display frame of the detailed information 924 newly displayed as a result of execution of the inter-camera adjustment processing are surrounded by, e.g., dotted lines, and therefore, the human image 923 and the detailed information 924 can be visually recognized in distinction from other search results. Note that displaying by the display frames surrounded by the dotted lines is one example, and any types of displaying such as blink displaying may be employed as long as the search result can be visually recognized in distinction from other search results.

Similarly, the reliability threshold adjustment slider 93 may be operated so that human images and human information newly displayed as a result of a manual change in the reliability (similarity) threshold can be visually recognized in distinction from other search results. For example, in a case where the number of human images as initially-displayed search results is small, the reliability threshold adjustment slider 93 can be moved to downwardly correct the reliability threshold to display more search results in human search.

Figure 11:
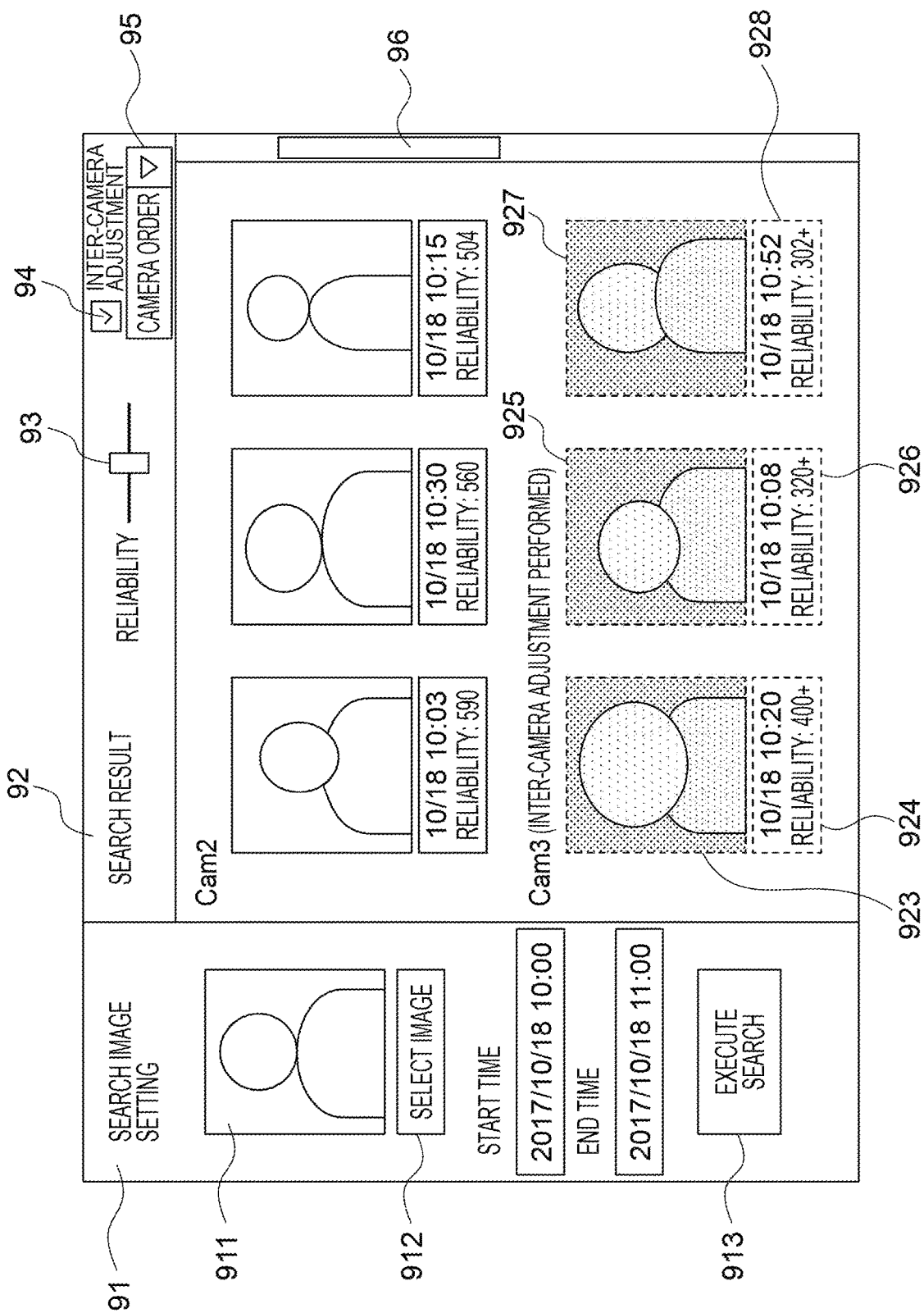
FIG. 11 is a view of one example of the display screen after displaying in a camera order has been instructed on the display screen of FIG. 10.

FIG. 11 illustrates a display example in a case where a search result display order has been changed to a camera order in the display order designation column 95.

In the display order designation column 95, the search result display order can be selected from any of the reliability order, the camera order, and a time order, for example. In the search result display region 92 of FIG. 11, the human images 923, 925, 927 as the search results and the detailed information 924, 926, 928 including the reliabilities for the human are, for each camera, sorted and displayed. In FIG. 11, in the search result display region 92, "ENTER-CAMERA ADJUSTMENT PERFORMED" is noted in a display region for the search results of the camera "Cam3" so that the search results of the camera "Cam3" obtained as a result of execution of the inter-camera adjustment processing can be visually recognized.

The example where the inter-camera adjustment processing is automatically activated and executed has been described with reference to FIGS. 6 and 7, but the present embodiment is not limited to above. For example, the user can separately adjust the similarity threshold for each of the multiple cameras 20a, 20b. 12 and 13 illustrate one example of a user interface for setting the similarity (reliability) threshold for each camera as described above. The user can check, via the user interface illustrated in FIGS. 12 and 13, in advance to guarantee that a search target image 1211 specified at S611 of FIG. 7 and a selected image 1221 as a candidate captured image from each camera are the same human. Moreover, the similarity threshold can be adjusted separately for each camera.

An adjustment human image specifying region 121 of FIG. 12 is a region where the human image to be used for adjusting the similarity threshold among the cameras is specified as the specific target. An image selection button 1212 is pressed to select the human image as the specific target in a manner similar to that in specifying of the search image of FIG. 9, and a search execution button 1213 is pressed to instruct the human search server 40 to execute human search.

The human selected in the adjustment human image specifying region 121 is preferably image-captured by all of the multiple cameras 20a, 20b targeted for adjustment. Thus, as described above, the inter-camera adjustment mode may be provided such that only the image of the same human is sequentially movably captured across the multiple cameras to guarantee the same human. The human information recorded during the inter-camera adjustment mode may be automatically set as the image as the specific target.

When human search is executed, the human image for which a high similarity indicating the highest similarity to the specific target image 1211 in the camera has been calculated is displayed as the selected image 1221 in a similarity threshold setting region 122 functioning as a search result display region. The selected image 1221 is displayed for each of the multiple cameras 20a, 20b. In a case where the human image displayed as the selected image 1221 is different from the human specified as the adjustment search target image 1211, the user presses a change button 1222. By pressing the change button 1222, the human images previously captured by the camera are listed, and an image of the same human as the human specified as the adjustment search target image can be specified as the selected image 1221 for the camera from the list of the multiple human images.

In FIG. 12, a similarity 1224 calculated for a selected image 1223 for the camera "Cam3" is displayed as "400." A similarity of "400" falls below a set similarity threshold of "500," and therefore, it shows that the human captured by the camera "Cam3" tends to have a lower similarity than those calculated for human captured by other cameras.

As described above, more search results also including the human image captured by the camera "Cam3" are displayed, and therefore, the user can change a similarity threshold 1225 for the camera "Cam3" from a default of "500" to "300," for example. Alternatively, an automatic setting button 123 may be pressed to execute the inter-camera adjustment processing illustrated in FIG. 7, thereby applying the adjustment value determined for each camera. In this manner, the similarity threshold to be set for each camera may be automatically adjusted.

As described above, when the similarity threshold 1225 for the camera "Cam3" has been changed from "500" to "300" by 200, human images for which a similarity (a reliability) equal to or higher than the changed similarity threshold 1225 has been calculated are subsequently newly displayed in the search result display region 92. Specifically, as illustrated in FIG. 10, the reliability displayed for the camera "Cam3" is calculated as a value (600) to which an adjustment difference of 200 has been added in the human search result display region 92, and therefore, the display order for the entirety of the search results is changed. That is, the display order for the search results is changed in descending order of a difference between the threshold set for each camera and the similarity after adjustment of such a camera.

In this manner, biased human search results among the cameras can be adjusted.

FIG. 13 is a display example of similarity threshold setting for cameras different from those of FIG. 12 in such a manner that a scroll bar 124 is operated to move downward in FIG. 12.

FIG. 13 illustrates that for a selected image 1226 for a camera name "Cam6," an appropriate search result cannot be obtained and therefore no image is displayed. In this case, the user can press the change button 1222 to select the same human as the human as the specific target for adjustment as in selection screen change operation of FIG. 12.

Alternatively, in a case where the image of the human as the specific target has not been captured by the camera "Cam6" at the first place or the human image as the specific target cannot be searched, the state of the selected image 1226 of FIG. 13 is brought. Note that in this case, the operation of selecting the selected image 1226 or changing the similarity threshold is not necessarily executed.

As described above, according to the present embodiment, the images captured by the multiple image capturing devices are analyzed. When the image search result for the search target is output from the image analysis processing results, the image capturing device having a lower similarity between the search target and the registered image than those calculated for other image capturing devices is identified. Then, in the present embodiment, the similarity calculated for the identified image capturing device can be adjusted such that the image captured by such an image capturing device is included in the output image search results. Moreover, when a low similarity is calculated, the identified image capturing device and the search result for the image captured by such an image capturing device can be notified in distinction from other image capturing devices and the image search results thereof. With this configuration, bias in the image search results to be output among the multiple image capturing devices due to, e.g., a difference in the image capturing conditions is adjusted. Thus, failure in output of the search results for the same human as the search target is reduced, and the accuracy of image search is improved.

Other Embodiments

Note that each of the above-described embodiments can be implemented in combination.

Moreover, the present invention can be implemented by a program for implementing one or more functions of the above-described embodiments. That is, the present invention can be implemented by the processing of supplying the program to a system or a device via a network or a storage medium and reading out and executing the program by one or more processors in a computer (or a CPU, a MPU, etc.) of the system or the device. Moreover, the program may be provided with the program being recorded in a computer-readable recording medium.

Moreover, each of the above-described embodiments may be applied to a system including multiple types of equipment such as a host computer, interface equipment, an image capturing device, and a web application, and may be applied to a device including a single type of equipment.

Further, the present invention is not limited to one configured such that the functions of the embodiments are implemented by execution of the programs read out by the computer. For example, based on a program instruction, e.g., an operating system (OS) operating on the computer may perform part or the entirety of actual processing, and the functions of the above-described embodiments may be implemented by such processing.

According to the present invention, the captured images from the multiple cameras can be, regardless of a difference in the image capturing conditions among the cameras, properly used to perform image search.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-047731, filed Mar. 15, 2018, which is hereby incorporated by reference herein in its entirety.

What is claimed is:

1. A search result display processing method in a monitoring system configured to display, as a search result, an image similar to an object of a search target from images captured by multiple cameras, the method comprising:
   a specifying step of specifying a camera to be adjusted among the multiple cameras based on a history of a similarity for the object searched from the images captured by the multiple cameras;
   a calculation step of calculating similarities for the images captured by the multiple cameras with respect to the object of the search target;
   an addition step of adding an adjustment value to a similarity for an image captured by the specified camera among the similarities calculated at the calculation step; and
   a display processing step of performing processing of displaying images in descending order of the similarity among the image having the similarity to which the adjustment value has been added at the addition step and an image captured by a camera different from the camera specified at the specifying step.

2. The display processing method according to claim 1, wherein
   at the specifying step, a camera having a lower similarity than an average of the similarities for the images captured by the multiple cameras by a value equal to or greater than a predetermined value is specified as the camera to be adjusted.

3. The display processing method according to claim 2, wherein
   the predetermined value is set according to user operation.

4. The display processing method according to claim 1, wherein
   at the specifying step, a camera having a lower similarity than a maximum value of the similarities for the images captured by the multiple cameras by a value equal to or greater than a predetermined value is specified as the camera to be adjusted.

5. The display processing method according to claim 4, wherein
   the predetermined value is set according to user operation.

6. The display processing method according to claim 1, wherein
   at the display processing step, the image from the camera specified as the camera to be adjusted is displayed in distinction from images of other cameras.

7. A search result processing device in a monitoring system configured to output, as a search result, an image similar to an object of a search target from images captured by multiple cameras, the device comprising:
   a specifying unit configured to specify a camera to be adjusted among the multiple cameras based on a history of a similarity for the object searched from the images captured by the multiple cameras;
   an addition unit configured to add an adjustment value to a similarity for an image captured by the specified camera among similarities calculated by a calculation unit which calculates the similarities for the images captured by the multiple cameras with respect to the object of the search target; and
   a processing unit configured to perform processing of outputting images in descending order of the similarity among the image having the similarity to which the adjustment value has been added by the addition unit and an image captured by a camera different from the camera specified by the specifying unit.

8. The processing device according to claim 7, wherein
   the specifying unit specifies, as the camera to be adjusted, a camera having a lower similarity than an average of the similarities for the images captured by the multiple cameras by a value equal to or greater than a predetermined value.

9. The processing device according to claim 8, wherein
   the predetermined value is set according to user operation.

10. The processing device according to claim 7, wherein
    the specifying unit specifies, as the camera to be adjusted, a camera having a lower similarity than a maximum value of the similarities for the images captured by the multiple cameras by a value equal to or greater than a predetermined value.

11. The processing device according to claim 10, wherein
    the predetermined value is set according to user operation.

12. The processing device according to claim 7, wherein
    the processing unit displays the image from the camera specified as the camera to be adjusted in distinction from images of other cameras.

13. A non-transitory computer-readable storage medium for storing a program for executing a search result processing method in a monitoring system configured to output, as a search result, an image similar to an object of a search target from images captured by multiple cameras, wherein the processing method comprises:
    a specifying step of specifying a camera to be adjusted among the multiple cameras based on a history of a similarity for the object searched from the images captured by the multiple cameras;
    a calculation step of calculating similarities for the images captured by the multiple cameras with respect to the object of the search target;
    an addition step of adding an adjustment value to a similarity for an image captured by the specified camera among the similarities calculated at the calculation step; and
    a processing step of performing processing of outputting images in descending order of the similarity among the image having the similarity to which the adjustment value has been added at the addition step and an image captured by a camera different from the camera specified at the specifying step.

14. The non-transitory computer-readable storage medium according to claim 13, wherein
at the specifying step, a camera having a lower similarity than an average of the similarities for the images captured by the multiple cameras by a value equal to or greater than a predetermined value is specified as the camera to be adjusted.

15. The non-transitory computer-readable storage medium according to claim 14, wherein
the predetermined value is set according to user operation.

16. The non-transitory computer-readable storage medium according to claim 13, wherein
at the specifying step, a camera having a lower similarity than a maximum value of the similarities for the images captured by the multiple cameras by a value equal to or greater than a predetermined value is specified as the camera to be adjusted.

17. The non-transitory computer-readable storage medium according to claim 16, wherein
the predetermined value is set according to user operation.

18. The non-transitory computer-readable storage medium according to claim 13, wherein
at the processing step, the image from the camera specified as the camera to be adjusted is displayed in distinction from images of other cameras.

* * * * *